United States Patent [19]

Katayama et al.

[11] Patent Number: 4,645,722
[45] Date of Patent: Feb. 24, 1987

[54] PHOTO-THERMO-MAGNETIC RECORDING MEDIUM AND METHOD OF PREPARING SAME

[75] Inventors: Toshikazu Katayama; Tsugio Shibata, both of Ibaraki; Hisao Arimune, Kagoshima, all of Japan

[73] Assignees: Director-General of Agency of Industrial Science & Technology, Tokyo; Kyocera Corp., Kyoto, both of Japan

[21] Appl. No.: 653,724

[22] Filed: Sep. 21, 1984

[30] Foreign Application Priority Data

Sep. 22, 1983 [JP] Japan ............... 58-174148

[51] Int. Cl.$^4$ ............... G11B 7/24
[52] U.S. Cl. ............... 428/694; 365/122; 360/131; 360/135; 428/900; 428/928
[58] Field of Search ............... 428/694, 900, 611, 622, 428/655, 678, 681, 928; 360/131, 135; 365/122

[56] References Cited

U.S. PATENT DOCUMENTS

| | | | |
|---|---|---|---|
| 4,347,112 | 8/1982 | Togami | 427/255.7 |
| 4,497,006 | 1/1985 | Deguchi et al. | 360/114 |
| 4,518,657 | 5/1985 | Yanagida | 428/900 |

FOREIGN PATENT DOCUMENTS 154291  5/1982  Japan .

OTHER PUBLICATIONS

Taylor et al, "Magnetic Anisotropy in Evaporated Amorphous Films of the Ternary System Gd(FeCo)", J. App. Phy., 48(1), 358, (1977).

Almasi et al, "Nonvolatile Magneto-Optical Memory Element," IBM TDB, vol. 14(1), Jun. 1971, p. 342.

Primary Examiner—George F. Lesmes
Assistant Examiner—William M. Atkinson
Attorney, Agent, or Firm—Spensley Horn Jubas & Lubitz

[57] ABSTRACT

A recording medium suitable for use in a photo-thermo-magnetic memory of high density recording, including a substrate; a first magnetic layer, such as an amorphous TbFe film, which has a large coercive force and whose axis of easy magnetization is oriented in the direction perpendicular to the surface of the first layer; and a second magnetic layer, such as an amorphous GdTbCoFe film, having (i) a larger polar Kerr rotation or reflection than that of the first layer, (ii) the same polarity of polar Kerr rotation as that of the first layer, (iii) a direction of its magnetic moment aligned in parallel with that of the first layer and (iv) a thickness permitting the transmittance of a light, such as laser beam, therethrough and being magnetically coupled with the first layer by an exchange interaction therebetween; the first and second magnetic layers being superimposed on the substrate in that order or in the inverse order. Such a recording medium can be suitably prepared by re-sputtering or ion-bombardment techniques.

7 Claims, 14 Drawing Figures

PHOTO-THERMO-MAGNETIC RECORDING MEDIUM AND METHOD OF PREPARING SAME

This invention relates to a photo-thermo-magnetic recording medium useful as photo-thermo-magnetic memories for high density recording, and a method of preparing such a recording medium.

A recording medium having a perpendicular magnetization film is used in photo-thermo-magnetic memory. By locally heating small domains of the film with a laser beam, inverse magnetization is induced there, whereby information is written thereon. The recorded information may be read out or reproduced by detecting the presence or absence of rotation of the plane of polarization of reflected or transmitted light due to magneto-optical Kerr effect or Faraday effect. The magneto-optical Kerr effect is currently utilized for the readout of the written information.

The photo-thermo-magnetic recording medium is required to satisfy the following conditions: (1) to have an axis of easy magnetization oriented in the direction perpendicular to the film surface and a large coercive force $H_c$; (2) to be large in magneto-optical Kerr rotation angle $\theta_K$ or the Faraday rotation angle $\theta_F$ and high in reflection factor R (or low in absorption coefficient in the case of Faraday effect); (3) to have an appropriate Curie temperature $T_c$ or magnetic compensation temperature $T_{comp}$; (4) to have a recording bit which has a small diameter and a broad margin and is stable; (5) to be chemically stable; (6) to permit production of a film of a large area and uniform composition with good reproducibility; and (7) to be free from medium noises attributable to defects or crystal grain boundaries.

On the other hand, the studies on the photo-thermo-magnetic recording material have thus far been directed to MnBi, MnCuBi, MnAlGe, MnGaGe, rare earth-magnetic garnet LPE films, amorphous rare earth-transition metal alloy films and the like. Although the above-mentioned photo-thermo-magnetic recording materials have respective merits and demerits, they have a common drawback that they are invariably low in magneto-optical effect including the magneto-optical Kerr rotation. Above all, the amorphous rare-earth-transition metal alloy (R-T alloy in which R stands for at least one rare earth element and T stands for at least one transition element) film is viewed with a special attention as it satisfies the above-mentioned requirements for the recording medium to a significant degree. However, because of its small magneto-optical Kerr rotation, such an alloy is not entirely suited for use as a photo-thermo-magnetic recording medium.

The magneto-optical Kerr rotation angle $\theta_K$ is a physical amount which is inherent to the electron structure of a magnetic substance in its surface layer of several hundreds angstrom and varies depending upon the wavelength. Besides, since the Kerr effect is produced by light reflection, it is greatly influenced by the surface conditions such as oxidation and stains. These circumstances are discussed, for example, in J. J. Erskine et al, Phys. Rev. B-8 (1973) p. 1239 and T. Katayama et al, Proc. 4th Int. Conf. Rapidly Quenched Metals II, (1982) p. 915. Therefore, in order to increase the magneto-optical Kerr rotaion angle $\theta_K$, it is necessary either to change the electron structure of a substance or to increase its apparent value by utilizing the interference of light or the like. The former method requires discovery of a new substance and many efforts have been made for this purpose.

Further, where the magneto-optical Kerr rotation $\theta_K$ is the same, a recording medium is preferred to have a higher reflection factor R. The situations for the reflection factor R are almost the same as in the case of the magneto-optical rotation angle $\theta_K$. Namely, whilst the reflection factor R can be improved to some extent by forming a film with less defects and oxidation, no essential improvement can be expected unless the substance itself is changed since the reflection factor R is substantially inherent to the substance.

The magneto-optical properties are inherent to the electron structure of a magnetic substance and the magneto-optical Kerr effect relying on reflected light is influenced by a surface layer of several hundreds angstrom. For example, in the case of an amorphous R-T alloy film, contribution of the rare earth element predominates at short wavelength in the ultraviolet region, and contribution of the transition element predominates at long wavelength in the infrared region. Accordingly, where the amorphous R-T alloy film is used at 780 nm or 830 nm of a semiconductor laser, a higher transition element concentration is generally required for a greater magneto-optical Kerr rotation. However, a content of the transition element in excess of a certain level will result in too high a value of magnetization or crystallization, making it difficult to form a vertical magnetization film with a large coercive force and rendering it unusable as a photo-thermo-magnetic recording medium. Thus, it has been considered difficult to satisfy at the same time the two conditions, i.e. attainment of a large magneto-optical rotation and formation of a perpendicular magnetization film having a high coercive force.

There are known Bi-added rare earth-iron garnet LPE films (expressed by a general formula A:R$_3$-(GaFe)$_5$O$_{12}$, where A represents Bi, Pb or the like and R is one or more rare earth elements), which is used as a magnetic bubble material. The films of this system are transparent at wavelength longer than visible light and have a large magneto-optical effect (e.g. Faraday rotation angle), but their application as a photo-thermo-magnetic recording medium has been hindered by inferiority in the coercive force $H_c$ and expensiveness. Therefore, it is considered to substitue part of Fe with Co for changing its magnetic anisotropy or to apply the film for a completely different purpose, for example, to apply as a magnetic transfer recording medium for reading out.

Heusler alloys with a composition of PtMnSb are known to have an extremely large magneto-optical Kerr effect. (See, for example, P. G. Van Engen et al, Appl. Phys. Lett. 42 (2) (1983) p. 202) But such alloys are too low in coercive force $H_c$ to form a satisfactory perpendicular magnetization film. As clear from the foregoing description, it is generally difficult to manufacture a perpendicular magnetization film which has a high coercive force $H_c$ along with a large magneto-optical Kerr rotation angle $\theta_K$.

With the above-described situation in view, the present invention provides a photo-thermo-magnetic recording medium comprising:

a substrate;

a first magnetic layer which has a large coercive force and whose axis of easy magnetization is oriented in the direction perpendicular to the surface of the first layer; and a second magnetic layer having a larger polar Kerr rotation or reflection than that of the first layer, the same polarity of polar Kerr rotation as that of the first layer, a direction of its magnetic moment aligned in parallel with that of the first layer and a thickness permitting the transmittance of a light therethrough and being magnetically coupled with the first layer by an exchange interaction therebetween, said first and second magnetic layers being superimposed on the substrate in that order or in the inverse order.

In the photo-thermo-magnetic recording medium according to the present invention, the first and second magnetic layers can be regarded as constituting a single perpendicular magnetization film because of the magnetic coupling therebetween. Therefore, the existence of the two separate layers can be detected only by measurement with a magneto-optical means; i.e. other measurement methods such as magnetic and magnetic torque measurements would fail to detect it. Since the situations are the same, the following description is directed mainly to the magneto-optical Kerr totation, giving remarks on the reflection only where necessary.

The preferred embodiments of photo-thermo-magnetic recording medium of the present invention will now be described with reference to the accompanying drawings, in which.

Figure 1:
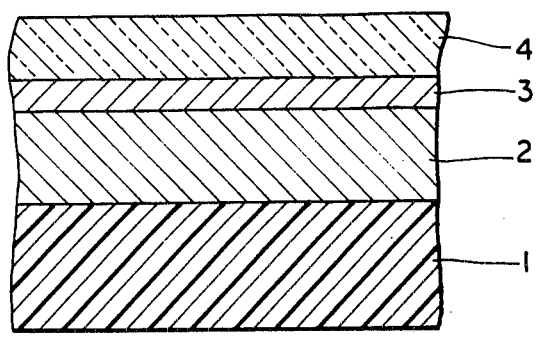
FIG. 1 is a cross-sectional view schematically illustrating one embodiment of recording medium according to the present invention.
Figure 8A:
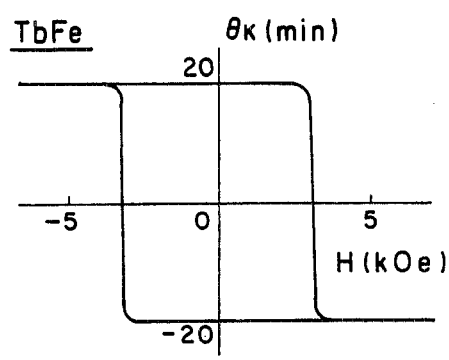
Figure 8B:
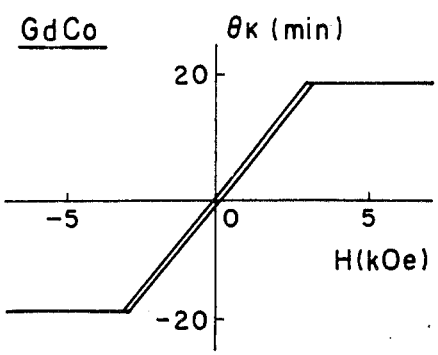
Figure 8C:
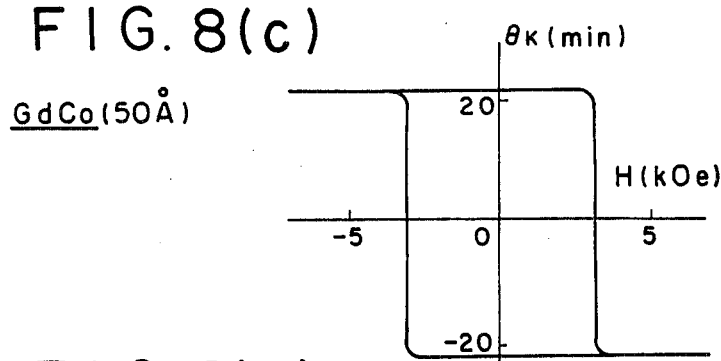
Figure 8D:
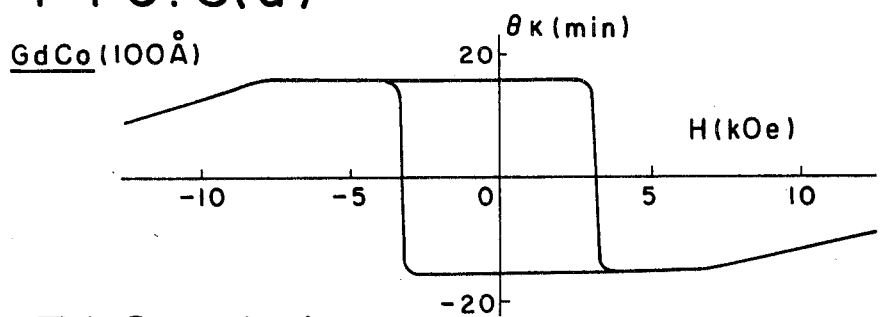
Figure 8E:
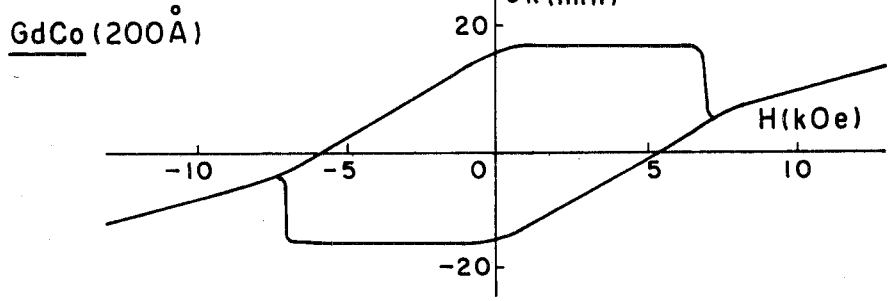
Figure 9:
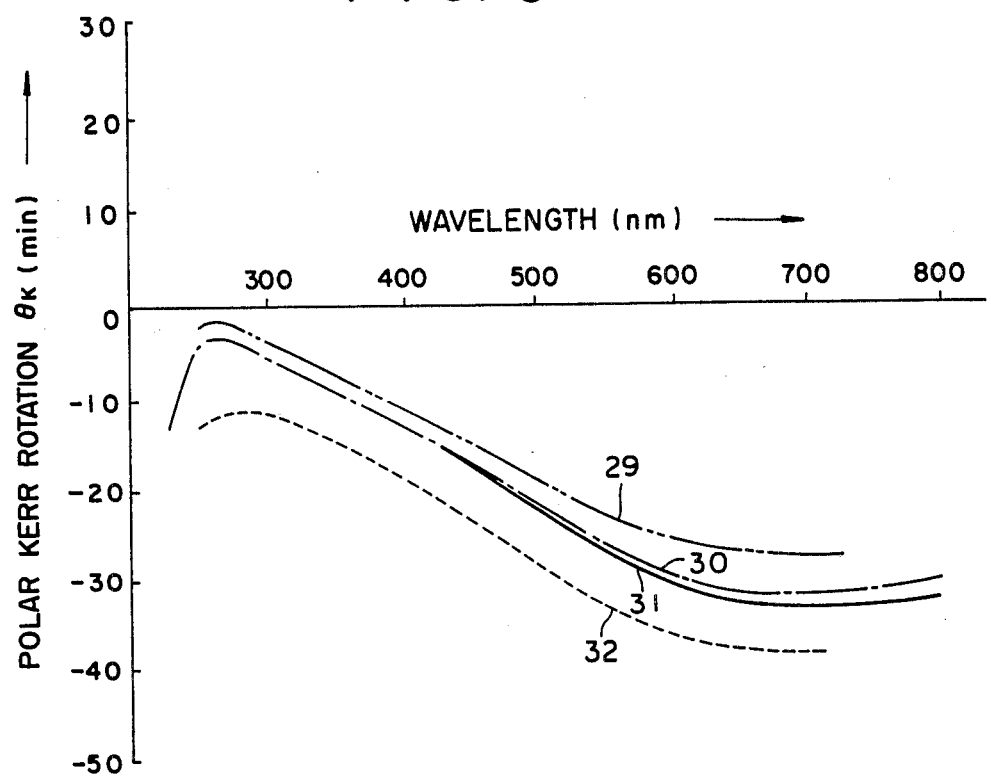
Figure 10:
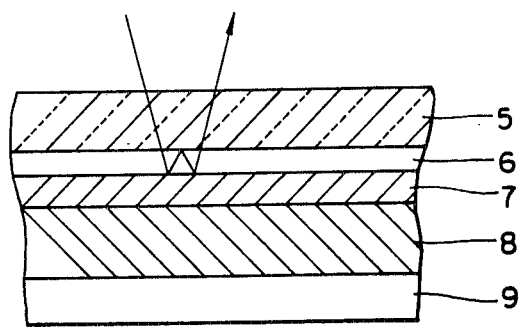

FIG. 8(a) and 8(b) are hysteresis loops of TbFe and GdCo films, respectively;

FIGS. 8(c) to 8(e) are hysteresis loops of GdCo films with various different thicknesses, superimposed over TbFe film;

FIG. 9 is a diagram showing the dependency on wavelength of recording media with a TbFe film overlaid with a GdCo film with a different magnetic anisotropy; and FIG. 10 is a cross-section similar to FIG. 1 showing another embodiment of the recording medium of this invention.

FIG. 1 depicts a photo-thermo-magnetic recording medium embodying the present invention. Indicated at 1 is a substrate of any conventional type formed of a glass, polyacrylic resins (PMMA), polycarbonate resins or ther like, on which a first magnetic layer 2 is provided. The first magnetic layer has its axis of easy magnetization oriented perpendicularly to the surface thereof and has a large coercive force. Preferably, the first layer has a Curie temperature $T_c$ or a magnetic compensation temperature $T_{comp}$ suitable for writing information thereon and has a thickness of about 1000–5000 angstrom. Provided over the first layer 2 is a second magnetic layer 3 which has the same polarity of magneto-optical Kerr rotation as that of the first layer 2, which has a larger polar Kerr rotation angle $\theta_K$ or reflection factor R than that of the first layer 2, which has a direction of its magnetic moment aligned in parallel with that of the first layer 2, which has a thickness permitting the transmittance of a light therethrough and which is magnetically coupled with the first layer 2 by an exchange interaction therebetween. In order to protect the second magnetic layer 3, a transparent film 4 of any suitable known material, such as a dielectric material, e.g. $SiO_2$, SiO, $MgF_2$, MgO, $Al_2O_3$, ZnS or the like is coated over the second magnetic layer 3 in a suitable thickness.

The material to be used for the first magnetic layer 2 may be any substance as long as it can form a perpendicular magnetization film with a large coercive force $H_c$ and a suitable Curie temperature $T_c$ or magnetic compensation temperature $T_{comp}$. Examples of suitable first magnetic layer 2 include amorphous R-T films (in which R represents one or more rare earth elements such as Gd, Tb, Dy, Er and Ho and T represents one or more transition metals selected from Fe, Co, Ni and Mn). Perpendicular magnetization films of MnCuBi, MnAlGe, MnGaGe, PtCo and the like may be also used, if desired.

On the other hand, the material for the second magnetic layer 3 may have any Curie temperature $T_c$, mganetic compensation temperature $T_{comp}$ and coercive force $H_c$. But the second magnetic layer 3 must be larger in at least either one of the magneto-optical Kerr rotation angle $\theta_K$ or the reflection factor R than those of the first magnetic layer 2. It is preferred that the second magnetic layer 3 be a perpendicular magnetization film, though other films may be used so long as no strong in-plane magnetic anisotropy is produced in the film. Illustrative of suitable materials for the second layer 3 are amorphous R-T films with a high concentration of transition element such as films of GdCo, GdTb, CoFe and GdTbCoFe with or without Sn, Sb or Bi being combined therewith. Films of MnCuSb, PtMnSb, FeSb, FeMnBi, CoMnSb, FeCoSb or the like may be used, if desired. It is preferred that the second magnetic layer 3 have a low saturation magnetization.

The second magnetic layer 3 is desired to have a laminar structure comprised of two or more thin films. An extremely thin single-layer film can produce similar effects, however. This implies the possibility of the respective magnetic layers being alloyed at the interface regions. However, the total thickness of the second magnetic layer 3 should be smaller than the light penetrating depth, preferably not greater than 500 angstrom. The term "light" used in the present specification in respect of the thickness of the second layer 3 is intended to mean the light such as a laser beam used for writing or reading information in the photo-thermo-magnetic recording medium. The light generally is a visible or near infrared ray.

It has been found that the second magnetic layer 3 which independently has not its axis of easy magnetization oriented in the direction perpendicular to the film surface functions almost in the fashion of perpendicular magnetization film by magnetic exchange interactions when the second magnetic layer 3 is thin and is provided over the first magnetic layer 2. In a case where the second magnetic layer 3 is a multi-layered film, it is desired that each of the constituent lamini or each alternate one of the lamini form a perpendicular magnetization film.

Further, it is advisable to form the above layers in vacuum or in the inert atmosphere to prevent oxidation of sufaces since otherwise the respective layers would fail to exhibit the required effects. The films may be formed by vapor evaporation, sputtering or ion plating techniques with a high precision control of the film thickness to secure the required thin film thickness. Furthermore, it is also possible to produce a composite structure substantially the same as that of FIG. 1 by injecting by bombardment suitable ions into the surface of the first layer to form a second layer with a high magneto-optical Kerr rotation angle $\theta_K$ or reflection factor R.

The following examples will further illustrate the present invention.

EXAMPLE 1

Figure 2:
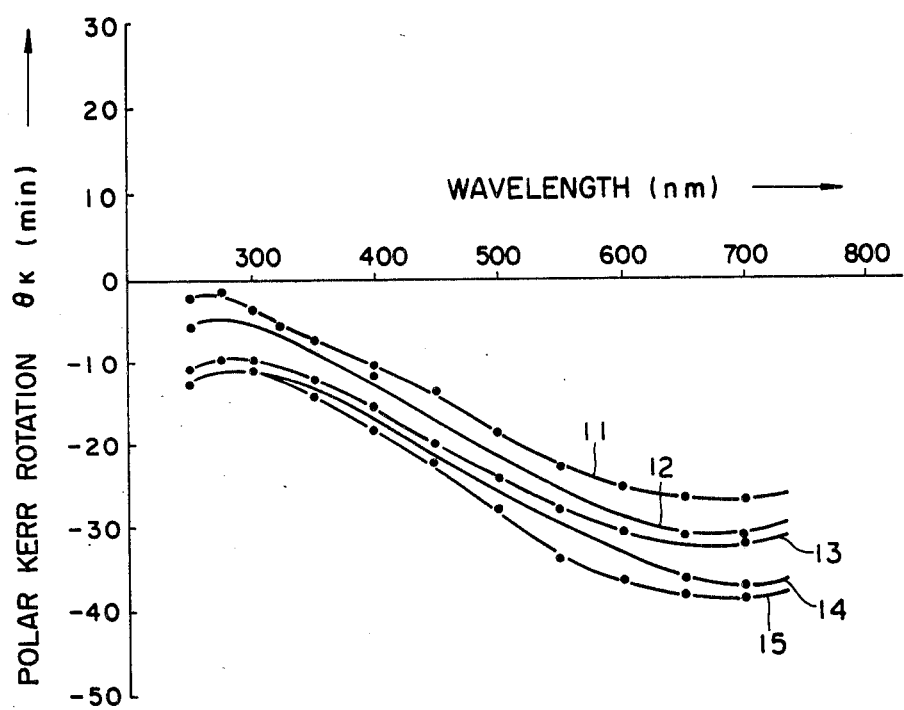
FIG. 2 is a characteristics diagram showing the dependency on optical wavelength of magneto-optical Kerr rotation of recording media with amorphous TbFe and GdCo films of different thicknesses.

Shown in FIG. 2 are the characteristics of the wavelength dependency of magneto-optical Kerr rotation of recording media of the present invention having second magnetic layers 3 each provided over the surface of a first magnetic layer 2. The first layer of each recording medium consisted of an amorphous TbFe perpendicular magnetization film (with a composition of $Tb_{23}Fe_{77}$, which is the same hereinafter unless otherwise specified) while the second magnetic layer 3 was composed of an amorphous GdCo film (with a composition of $Gd_{19}Co_{81}$, which is the same hereinafter unless otherwise specified). The first layers of the media had the same thickness with each other, while the second layers had different thicknesses. To prevent oxidation, the top film of each of the recording media was covered with a film of $SiO_2$ having a thickness at which the magneto-optical Kerr rotation angle $\theta_K$ showed a peak against a light having a wavelength in the vicinity of 700 nm. In this instance, the dependency on wavelength of the magneto-optical Kerr rotation was measured through the $SiO_2$ film in the residual magnetization state. The compositions of the first and second magnetic layers were so selected that the magnetic moments of Fe and Co became parallel with each other. The GdCo film was formed by applying a bias voltage of −100 V.

In FIG. 2, curves 11 and 15 show the characteristics of the conventional recording media having an amorphous TbFe perpendicular magnetization film alone and amorphous GdCo perpendicular magnetization film alone, respectively. Curves 12 through 14 show the characteristics of the recording media of the present invention having thicknesses of the amorphous GdCo film of 100, 200 and 1000 angstrom, respectively.

As seen in FIG. 2, the recording media having amorphous GdCo films coated over the TbFe film have a greater magneto-optical Kerr rotation angle $\theta_K$ than that of the recording medium having the TbFe film alone. The magneto-optical Kerr rotation increases with the increase in the thickness of the GdCo film, as seen from FIG. 2. It is also noted that the provision of the GdCo film in a thickness as small as 100 angstrom can bring about a sharp increase in the magneto-optical Kerr rotation. However, the increase of the GdCo film thickness necessitates the raise of the power for write-in from the film surface and finally makes the write-in infeasible.

Figure 3:
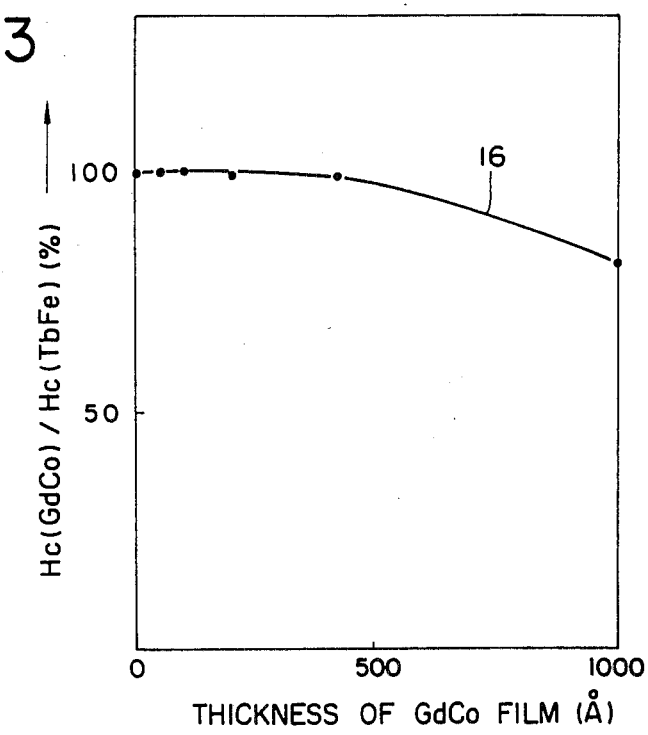
FIG. 3 is a diagram showing the relationship between the ratio of the coercive force $H_c$ measured on the surface of a GdCo film to the coercive force $H_c$ of a TbFe film and the thickness of the GdCo film.

Referring to FIG. 3, there is plotted the ratio of the coercive force $H_c$ as measured on the GdCo coated surface to the coercive force $H_c$ of the TbFe film, against the thickness of the GdCo film. As seen from curve 16, the coercive force $H_c$ shows a drop when the thickness of the GdCo film is 1000 angstrom. Almost no changes in coercive force are seen, however, when the GdCo film is thin. The coercive force $H_c$ of the GdCo film alone is about 20 Oe, while the coercive force $H_c$ of the TbFe film alone is about 6–7 KOe. Upon measuring the magnetization curve of the film of the construction according to the embodiment of the present invention, it is found to be difficult to discriminate the second layer from the first layer if the film is thin, and it is only a thickness of about 1000 angstrom that the discrimination becomes possible.

EXAMPLE 2

Figure 4:
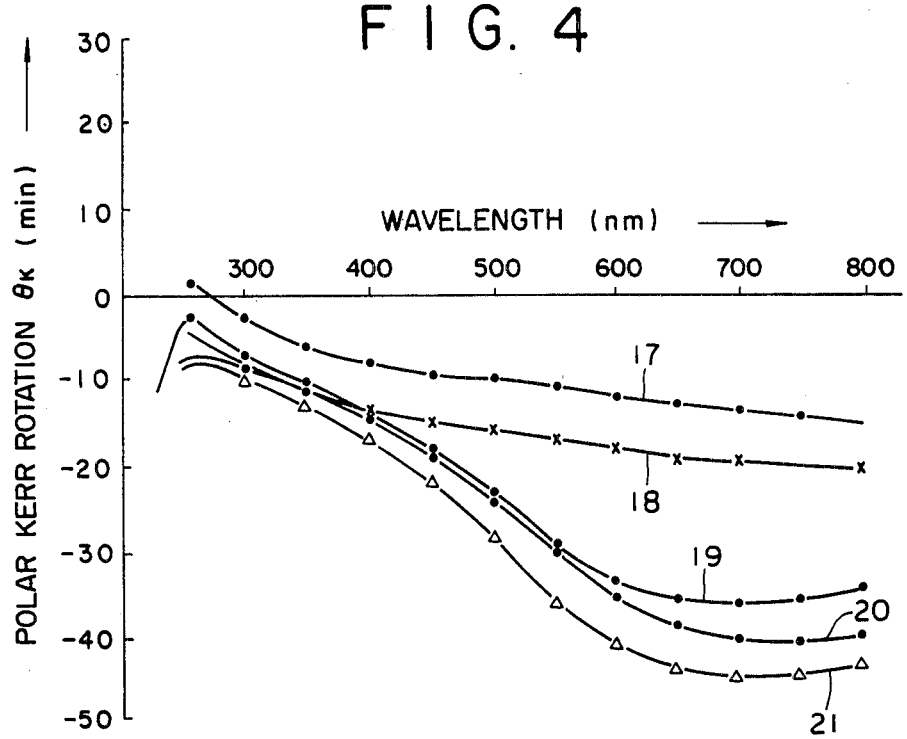
FIG. 4 is a characteristics diagram showing the dependency on wavelength of magneto-optical Kerr rotation of recording media with amorphous TbFe and GdTbCoFe films of different thicknesses.

FIG. 4 shows the dependency on wavelength of the magneto-optical Kerr rotation angle $\theta_K$ of recording media having a first magnetic layer 2 formed of an amorphous TbFe film, a second magnetic layer formed of an amorphous GdTbCoFe film with a thickness of 50 or 200 angstrom, and a $SiO_2$ protecting layer with a thickness of about 420 angstrom (curves 19 and 20). Curves 17 and 18 are characteristics of a TbFe film alone and of a GdTbCoFe film alone (without $SiO_2$ layer), respectively. Curve 21 plots the results of a GdTbCoFe film covered with a 420 angstrom protecting layer of $SiO_2$. At the wavelength of 700 nm, the values of magneto-optical Kerr rotation angle $\theta_K$ of the curves 21 and 20 are −45 and −40 minutes, respectively, which are far greater than that of the TbFe film (curve 17). Curve 18 shows the dependency on wavelength of the intrinsic magneto-optical Kerr rotation of the GdTbCoFe film which is greater than that of TbFe or GdCo film. (The intrinsic magneto-optical rotation angle $\theta_K$ normally means a value which is measured on an uncoated, free surface of a material in vacuum. However, a value which is measured in air immediately after the formation of the film exhibits almost no appreciable difference, such a value is given as "an intrinsic value" in the present example). It has been found that in the case of R-T films, a polyelemental substance containing two or more rare earth elements and/or two or more transition elements has a greater magneto-optical Kerr rotation angle $\theta_K$. Further, the magneto-optical Kerr rotation can be increased by the use of a R-T film which is added with Sn, Bi, Sb or the like. Although the magneto-optical Kerr rotation angle $\theta_K$ of the GdTbCoFe film varies depending upon the composition of respective elements, the GdTbCoFe film used in the present example approximately had a composition of $Gd_7Tb_{14}Co_{41}Fe_{38}$. Further, better results were found to be obtained when the second magnetic layer 3 of FIG. 4 was formed in a multi-layered structure consisting of GdTbCoFe and TbFe films. Meanwhile, the Curie temperature $T_c$ of the amorphous GdTbCoFe film increases with an increase in the Co content. However, as the magnetic properties of the first magnetic layer 2 are predominant in the above cases, write-in at the Curie temperature $T_c$ is feasible in the same manner as in the case where the second magnetic layer 3 is absent. Furthermore, where a Co film which does not constitute a perpendicular magnetization film is used for the second magnetic layer 3, it functions almost as a perpendicular magnetization film if provided in an extremely small thickness and the magneto-optical Kerr rotation angle $\theta_K$ is increased, although the squareness of its hysteresis loop is low.

Figure 5:
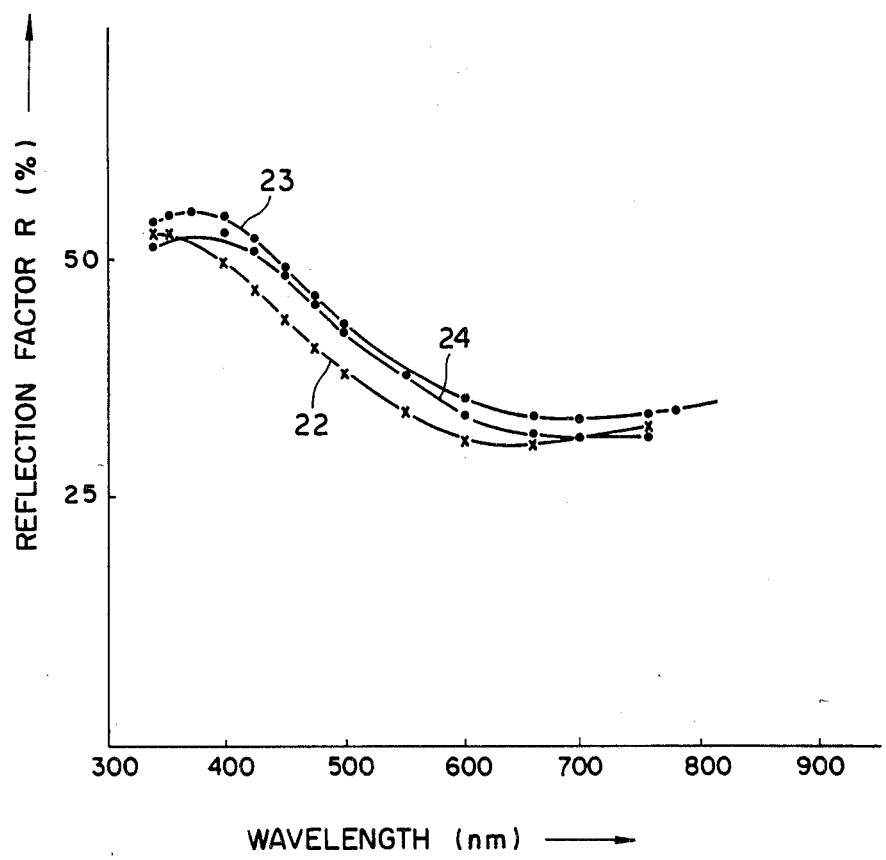
FIG. 5 is a diagram showing the dependency on wavelength of reflection factor of an amorphous TbFe film, an amorphous GdTbCoFe film and composite films according to the present invention.

FIG. 5 shows the dependency on wavelength of the reflection factor R of the amorphous TbFe film having a SiO$_2$ layer provided thereon (curve 22), the amorphous GdTbCoFe film having a SiO$_2$ film provided thereon (curve 23), and the recording media of the present invention, one of which was composed of an amorphous TbFe film, an amorphous GdTbCoFe film (200 angstrom) and a SiO$_2$ layer and the other one of which was formed of a TbFe film, a multi-layered film consisting of amorphous GdTbCoFe (70 angstrom), TbFe (70 angstrom) and GdTbCoFe (70 angstrom) films and a SiO$_2$ layer (curve 24). These films are each covered with about 420 angstrom thick SiO$_2$, so that the reflection factor of each film becomes minimal at a wavelength in the vicinity of 700 nm. As will be seen from curves 23 and 24, the recording media of the present invention have a higher reflection factor R. Such a large reflection factor R improves the S/N ratio at the time of read-out, giving the same effect as an increase in the magneto-optical Kerr rotation.

EXAMPLE 3

Figure 6:
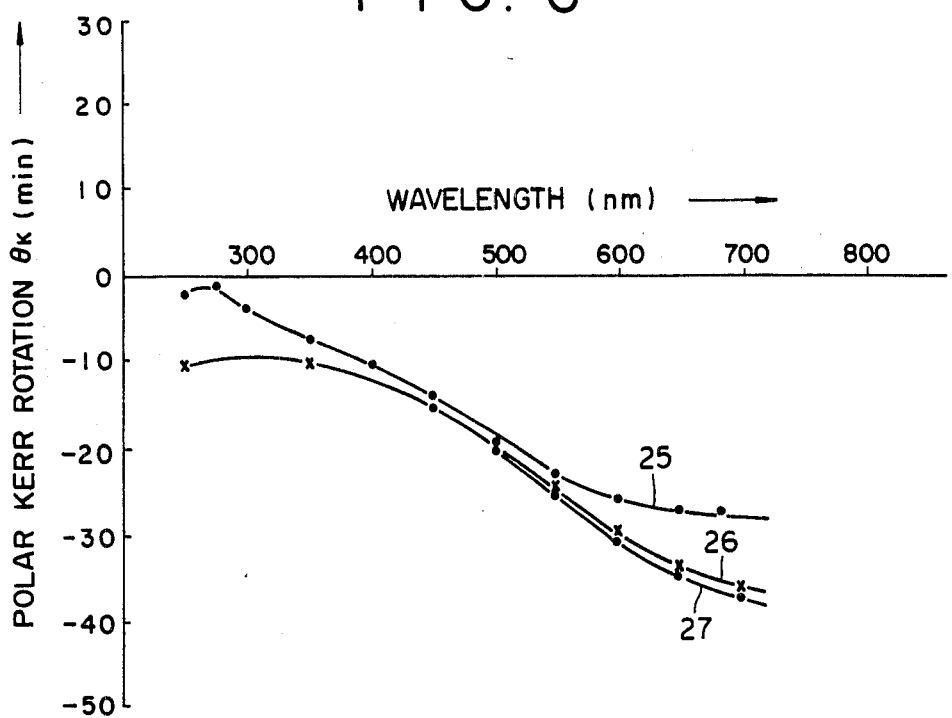
FIG. 6 is a characteristics diagram showing the dependency on wavelength of magneto-optical Kerr rotation of recording media with amorphous TbFe (obtained at a bias voltage $V_b$ of $-1V$) and TbFe (obtained at a bias voltage $V_b$ of $-120V$) of various thicknesses.

In a case where a sputtering method is adopted, it is possible to form a photo-thermo-magnetic recording medium of the above-described construction through utilization of deviations in composition due to preferential re-sputtering effect and variations in magnetic anisotropy (these effects are discussed in detail in T. Katayama et al, J. Mg. Magn. Mat. 35 (1983) p. 235). For example, where the amorphous TbFe film is used, the first magnetic layer 2 is produced by application of a low negative bias (inclusive of zero volt) or a positive bias voltage $V_b$ (generally $V_b \geq -20$ V) and then the second magnetic layer 3 is formed in a thickness smaller than a light penetrating distance by applying a different high negative bias voltage $V_b$ (generally $V_b \leq -100$ V). By so doing, there can be obtained a photo-thermomagnetic recording medium of a construction similar to the foregoing examples. This method involves only one kind of target so that it becomes possible to simplify the construction of the manufacturing system in addition to relatively easy bias control. FIG. 6 shows examples of this method. Namely, there is shown the dependency on wavelength of the magneto-optical Kerr rotation angle $\theta_K$ of recording media each having an amorphous TbFe film (first magnetic layer) produced by appliation of a bias voltage of $-1$ V and an amorphous TbFe layer (second magnetic layer) formed thereon by application of a bias voltage of $-120$ V. Similar to the foregoing examples, SiO$_2$ layer was provided such that the magneto-optical Kerr rotation angle $\theta_K$ has a peak at a wavelength in the vicinity of 700 nm.

In FIG. 6, curve 25 is a plot for an amorphous TbFe film alone, and curves 26 and 27 are plots for two layered structures having second amorphous TbFe films with thicknesses of 200 and 400 angstrom, respectively, formed on each first TbFe film.

As clear from FIG. 6, due to the provision of the TbFe film formed at a bias voltage of $-120$ V (producing a film having a high Fe concentration by the re-sputtering effect), the magneto-optical Kerr rotation angle $\theta_K$ is increased greatly at a wavelength in the vicinity of 700 nm. In this instance, the bias voltage may be varied in a range in which perpendicular magnetic anisotropy is induced in the second magnetic layer 3, thereby to form a multi-layered structure with different compositions. The merits of such a structure include a high coercive force $H_c$ and a stability of recording bits. With a Fe-base magnetic recording medium which is produced by the above method, the Curie temperature $T_c$ of the second magnetic layer 3 is slightly lower than that of the first magnetic layer 2, and therefore the write-in power can be lowered to some extent. The first and second magnetic layers 2 and 3 are so formed as to maintain parallelism of spins between T and T and between R and R of respective layers. In the case of an amorphous R-T film, the re-sputtering effect is varied also depending upon the sputtering gas pressure $P_{Ar}$ to form a perpendicular magnetization film in a certain range. Accordingly, this can be utilized to produce a photo-thermo-magnetic recording medium of a similar structure. The range of $V_b$ or $P_{Ar}$ which induces perpendicular magnetic anisotropy $K_u$ in amorphous R-T film varies depending upon the nature of the material and does not necessarily take a fixed value (see T. Katayama et al, IEEE Trans. Mag. MAG-13 (1977) p. 1063).

EXAMPLE 4

Figure 7:
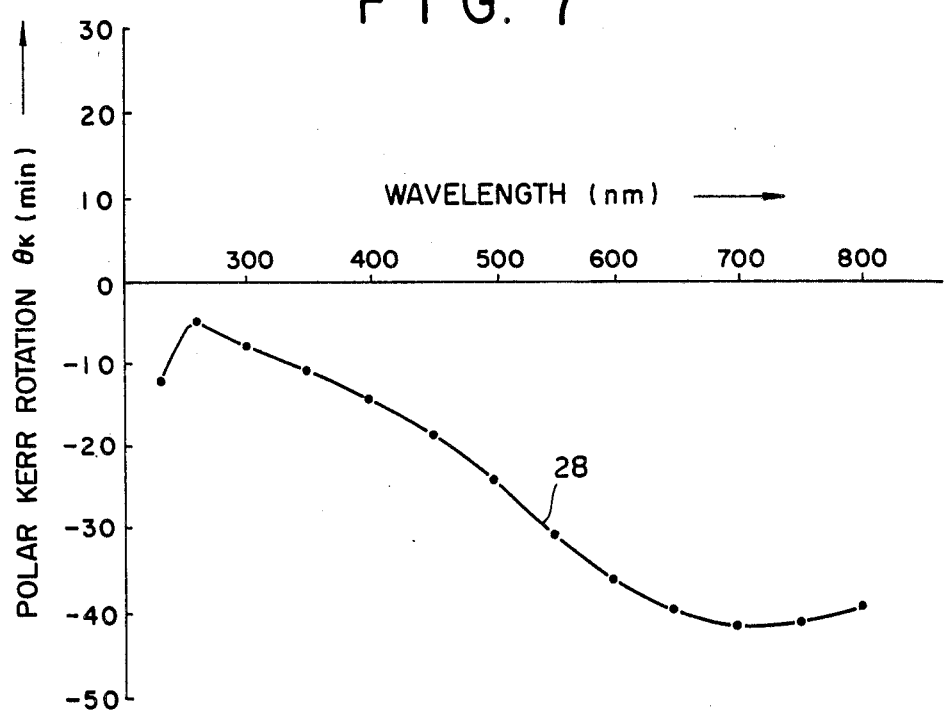
FIG. 7 is a diagram showing the dependency on wavelength of magneto-optical Kerr rotation of the recording medium of the present invention having an amorphous TbFe film overlaid with two ultra-thin GdTbFeCo and TbFe films.

As mentioned hereinbefore, the second magnetic layer 3 is more effective if it is in the form of a multi-layered film structure consisting of a number of extremely thin films. FIG. 7 shows the dependecy on wavelength of the magneto-optical Kerr rotation angle $\theta_K$ of such a recording medium, which includes a 5000 angstrom thick amorphous TbFe film (first magnetic layer) 2 provided on a glass substrate 1, a multi-layered second magnetic layer 3 provided over the first magnetic layer 2 and composed of a GdTbCoFe film of 70 angstrom, a TbFe film of 70 angstrom and a GdTbCoFe film of 70 angstrom, and a protecting layer coated on the second magnetic layer 3 and formed of SiO$_2$. In this case, the second magnetic layer 3 of a three-layered structure shows about one minute higher value in magneto-optical Kerr rotation angle $\theta_K$ at the wavelength of 700 nm than the value obtained from an about 200 angstrom thick GdTbCoFe film in FIG. 4. The second magnetic layer 3 of elaborately overlapped layers of extremely thin films has higher effects along with greater squareness of the hysteresis loop and larger coercive force $H_c$ (the squareness is about 1 and the coercive force $H_c$ is about 4 KOe in the the recording medium of this example).

EXAMPLE 5

In this example, a magnetic film whose axis of easy magnetization is not oriented in the direction perpendicular to the film surface is employed as the second magnetic layer 3. Thus, an amorphous TbFe film (5500 angstrom) provided over a glass substrate was covered with an amorphous GdCo film having a magnetic anisotropy $K_u$ of $-1.5 \times 10^5$ erg/cc, over which was further provided a protecting layer formed of SiO$_2$. FIGS. 8(c), 8(d) and 8(e) show hysteresis loops of magneto-optical Kerr rotation at an optical wavelength of 500 nm of the recording media having thicknesses of the GdCo layer of 50, 100 and 200 angstrom, respectively. FIGS. 8(a) and 8(b) show similar hysteresis loops of recording media having no GdCo film and no TbFe film, respectively. As will be seen from FIGS. 8(a) and 8(c), the magneto-optical Kerr rotation angle $\theta_K$ is increased when the GdCo film of a 50 angstrom thickness is provided over the TbFe film. It is also noted that the shape of the hysteresis loop is almost the same. These facts indicate that the thin GdCo film is magnetically coupled with the TbFe film so that the magnetic moment of the GdCo is oriented in parallel with that of the TbFe film. With an increase of the thickness of the GdCo film, however, the $\theta_K$ is decreased with the simultaneous change of the shape of the hysteresis.

The wavelength dependency of the recording medium of FIG. 8(c) (CdCo: 50 angstrom, $K_u<0$, prepared at $V_b$ of $-1V$) is shown by curve 30 in FIG. 9. Curve 31 is the wavelength dependency of the recording medium having the same structure as that of the recording medium of FIG. 8(c) except that the $K_u$ of the GdCo layer is positive (prepared at $V_b$ of $-100$ V). Curves 29 and 32 are the wavelength dependency of the magneto-optical Kerr rotation of recording media of FIG. 8(a) and 8(b), respectively. From the results shown in FIG. 9, it is appreciated that when the thickness of the second magnetic layer is small, the layer 3 need not be a perpendicular magnetization film so long as it does not bring about a strong magnetic anisotropy in the film surface.

Although the surface of the recording media is covered with $SiO_2$ layer in the foregoing examples, it is possible to substitute it with other transparent dielectric film. It is further possible to increase the magneto-optical Kerr rotation more at a particular wavelength by controlling the thicknesses of respective films. It is also advisable to select the kind of the transparent dielectric film 4 according to the kind of the medium. When the substrate is transparent, read out of the stored memories may be effected from the substrate side to minimize the influence of dusts or stains on the surface of the magnetic film. FIG. 10 illustrates one preferred embodiment of the recording medium of this type. In FIG. 10, the reference numeral 5 is a glass substrate, 6 a transparent interference layer, 7 a second magnetic layer (corresponding to the layer 3 of FIG. 1), 8 a first magnetic layer (corresponding to the layer 2 of FIG. 1) and 9 is a protecting layer (corresponding to the layer 4 of FIG. 1). By providing the layer 6, the magneto-optical Kerr rotation may be increased by interference.

It will be appreciated from the foregoing detailed description that the present invention has succeeded in providing a novel photo-thermo-magnetic recording medium of a structure which has a high magneto-optical Kerr rotation and/or high reflection, by effectively using the magnetic properties of a relatively thick first magnetic layer. Namely, as shown in the foregoing examples, owing to interfacial effects and magnetic interactions of the second magnetic layer having a thickness permitting the transmittance therethrough of a light, it becomes possible to produce a new medium of an integral structure which is high in magneto-optical Kerr rotation and/or reflection to permit write-in at the Curie temperature. Especially in the case of a multi-layered film having alternately arranged GdTbCoFe films, there can be obtained a recording medium which has a high magneto-optical Kerr effect and which allows the write-in at the Curie temperature (this is difficult with the GdTbCoFe film alone), in addition to satisfactory reflection and squareness.

Further, the second magnetic layer obtained in the specific embodiment of the present invention, in which different bias voltages are employed for sputtering, permits the production of a recording medium which has a higher magneto-optical Kerr rotation as compared with conventional recording media, in addition to advantages such as low write-in power and high bit stability. Moreover, this method further has a merit that the above-described recording medium can be produced in a shorter period of time without need of manufacturing equipments of a large scale.

When ion bombardment or the like is employed for producing a photo-thermo-magnetic recording medium of a multi-layered film, while selecting desired different kinds of ions, it is possible to obtain an excellent recording medium which is basically different from conventional products in composition and other aspects.

We claim:

1. A photo-thermo-magnetic recording medium comprising:
   a substrate;
   a first magnetic layer which has a large coercive force and whose axis of easy magnetization is oriented in the direction perpendicular to the surface of the first layer; and
   a second magnetic layer, said second layer being a composite layer formed of two or more magnetic thin films, the composition of each of the magnetic thin films differing from that of its adjacent magnetic thin film or films, said second layer having either or both of the polar Kerr rotation angle and the reflection factor larger than the polar Kerr rotation angle and the reflection factor, respectively, of said first layer, said second magnetic layer also having the same polarity of polar Kerr rotation as that of the first layer, the direction of its magnetic moment aligned in parallel with that of said first layer, a thickness permitting the transmittance of light therethrough and being magnetically coupled with the first layer by an exchange interaction therebetween;
   said first and second magnetic layers being superimposed on the substrate in that order.

2. The recording medium as claimed in claim 1, wherein said recording medium further comprises a transparent protecting layer provided over the surface of said second layer.

3. A photo-thermo-magnetic recording medium comprising:
   a substrate formed of a transparent material;
   a first magnetic layer which has a large coercive force and whose axis of easy magnetization is oriented in the direction perpendicular to the surface of the first layer; and
   a second magnetic layer, said second layer being a composite layer formed of two or more magnetic thin films, the composition of each of the magnetic thin films differing from that of its adjacent magnetic thin film or films, said second layer having either or both of the polar Kerr rotation angle and the reflection factor larger than the polar Kerr rotation angle and the reflection factor, respectively, of said first layer, the second magnetic layer having the same polarity of polar Kerr rotation as that of said first layer, the direction of its magnetic moment aligned in parallel with that of said first layer, a thickness permitting the transmittance of light therethrough and being magnetically coupled with the first layer by an exchange interaction therebetween;

said first and second magnetic layers being superimposed on the substrate with said second layer between said substrate and said first layer.

4. The recording medium as claimed in claim 3, wherein said recording medium further comprises a protecting layer provided over the surface of said first layer, and an interference layer provided between said substrate and said second layer.

5. The recording medium as claimed in claim 1 or 3 wherein said two or more magnetic thin films include alternating GdTbCoFe films.

6. The recording medium as claimed in claim 1 or 3 wherein said two or more magnetic thin films include alternating perpendicular magnetization films.

7. A photo-thermo-magnetic recording medium comprising:

a substrate;

a first magnetic layer having a large coercive force and an axis of easy magnetization oriented in the direction perpendicular to the surface of the first layer; and a second magnetic layer having a laminate structure comprised of two or more magnetic thin films, wherein only every other one of said two or more thin magnetic films is GdTbFeCo, said second layer having either or both of the polar Kerr rotation angle and the reflection factor larger than the polar Kerr rotation angle and the reflection factor, respectively, of said first layer, a thickness permitting the transmittance of light therethrough and being magnetically coupled with said first layer by an exchange interaction therebetween, at least each alternate one of the constituent magnetic thin films of said layer having a direction of its magnetic moment aligned and parallel with that of said first layer;

said first and second magnetic layers being superimposed on the substrate wtih said first layer between the substrate and said second layer.

* * * * *